United States Patent [19]

Takeuchi et al.

[11] Patent Number: 5,148,334
[45] Date of Patent: Sep. 15, 1992

[54] PHASE SYNCHRONIZATION CIRCUIT

[75] Inventors: Takikazu Takeuchi; Hiroyuki Yokohara; Takuji Ogawa; Noboru Sakurai, all of Odawara, Japan

[73] Assignees: Hitachi, Ltd., Tokyo; Hitachi Computer Peripherals Co., Ltd., Odawara, both of Japan

[21] Appl. No.: 444,764

[22] Filed: Dec. 1, 1989

[30] Foreign Application Priority Data

Dec. 5, 1988 [JP] Japan ................. 63-305936

[51] Int. Cl.$^5$ .............................................. G11B 5/09
[52] U.S. Cl. .................................................. 360/51
[58] Field of Search ............... 360/51, 45, 46; 375/11, 375/81

[56] References Cited

U.S. PATENT DOCUMENTS 4,958,243  9/1990  Chen et al. ................. 360/51
4,970,609  11/1990 Cunningham et al. ........ 360/51

FOREIGN PATENT DOCUMENTS 59-165209  9/1984  Japan .
59-178608  10/1984 Japan .

*Primary Examiner*—Vincent P. Canney
*Attorney, Agent, or Firm*—Kenyon & Kenyon

[57] ABSTRACT

Every other input pulse is extracted from an input signal containing alternate phase-advanced and phase-delayed pulses read out of a magnetic disk unit, a magnetic tape unit or the like. Output pulses in synchronism with the pulses thus extracted are produced. This extraction may be effected only during a predetermined length of time after staring application of the input pulses at the time of pull-in of a phase sync circuit. Whether phase synchronization is to be effected in accordance with advanced-phase or delayed-phase input pulses is determined from time to time as required.

4 Claims, 3 Drawing Sheets

F I G. 1
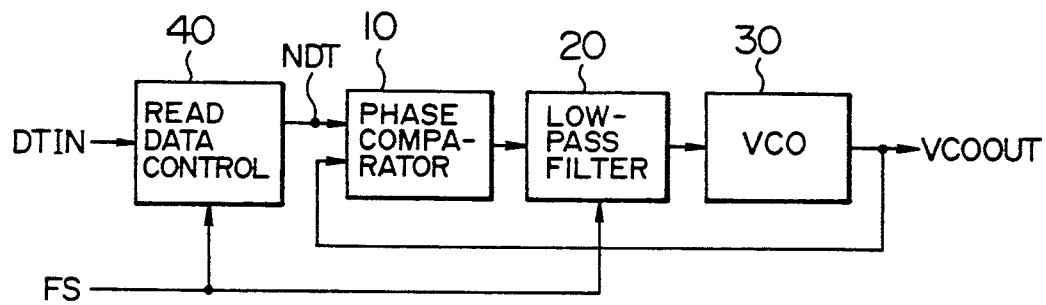
F I G. 2
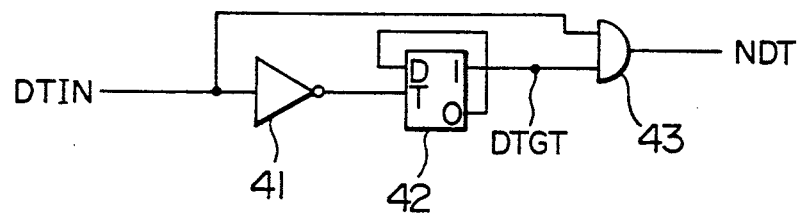
F I G. 3
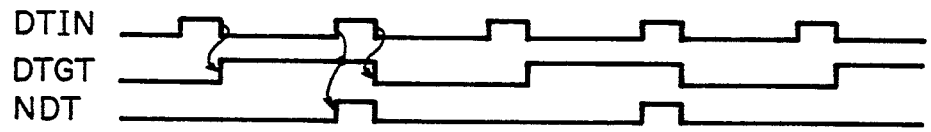
F I G. 4
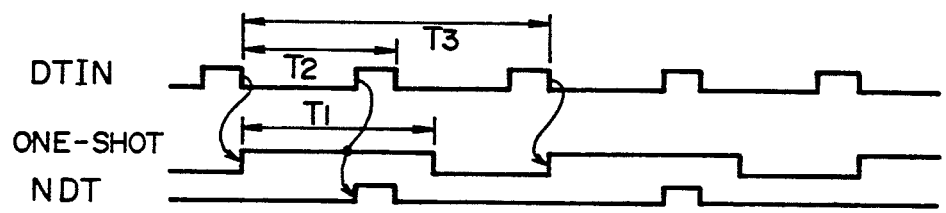

PHASE SYNCHRONIZATION CIRCUIT

BACKGROUND OF THE INVENTION

The present invention relates to a phase synchronization circuit, and more in particular, to a phase synchronization circuit suitable for producing an output timing pulse in phase with an input pulse signal, with the phase thereof delayed and advanced alternatively like a read data signal of a magnetic recording apparatus.

In a magnetic recording apparatus such as a magnetic disk unit or a magnetic tape unit, a phase sync circuit like the one shown in FIG. 10 is generally used to produce a timing signal in phase with the data read out of a recording medium. The phase sync circuit shown in FIG. 10 is required to comprise a frequency-following function for meeting the frequency variations of a read data signal DTIN attributable to a change in the feed rate of the recording medium, source voltage or ambient temperature, and also to comprise a jitter suppression characteristic for coping with instantaneous timing variations caused by pattern peak shifts or noises. As a result, a conventional phase sync circuit comprises a phase comparator 10 for detecting the phase difference between a read data signal DTIN and an output signal VCOOUT of the phase sync circuit, a low-pass filter 20 for smoothing the phase difference signal thus detected and producing a DC signal "A" proportional to the phase difference, and a voltage-controlled oscillator (VCO) for producing an output signal VCOOUT with the oscillation frequency controlled by the DC signal A.

Now, the operation of a conventional circuit shown in FIG. 10 will be explained. When the output signal VCOOUT is delayed from the phase of a read data signal DTIN, for example, a delayed phase difference is detected by the phase comparator 10, and the voltage of the DC phase difference signal A produced from the low-pass filter 20 is increased. The voltage increase of the DC signal A increases the oscillation voltage of the voltage-controlled oscillator 30, and the resulting increase in the oscillation frequency advances and corrects the phase of the output signal VCOOUT.

When the phase of the output signal VCOOUT is advanced from the read data signal DTIN, on the other hand, the phase comparator 10 detects an advanced phase difference which in turn reduces the voltage of the AC signal A. This decrease in the voltage of the DC signal A decreases the oscillation voltage of the voltage-controlled oscillator 30 for a reduced oscillation frequency, thus correcting by delaying the phase of the output signal VCOOUT. Usually, in the absence of a peak shift of the read data signal DTIN, delayed or advanced phase differences are continuously detected at the time of phase correction of a phase sync circuit, so that the phase difference is gradually reduced until the sync process is completed with the phase difference eliminated. Also, when synchronization with the read data signal DTIN is to be attained from a free-running state of the voltage-controlled oscillator 30, the low-pass filter 20 is controlled to a high-speed sync responding state by a signal FS in order to complete the sync process within a short time, and upon completion of the sync process, it is controlled to a low-speed sync responding state in order to maintain a steady operation.

The phase sync circuit of this type has a jitter suppression characteristic against an instantaneous peak shift of the read data ocurring every several or several tens of read data pulses, for example. As disclosed in JP-A-59-165209 and JP-A-59-178608, however, such a circuit fails to take into consideration the magnetic recording characteristic in which peak shifts of phase delay and advance occur alternately due to a predetermined amount of distortion or the like of a read waveform.

The disclosures in JP-A-59-165209 and JP-A-59-178608 are also related to the present invention. Specifically, JP-A-59-165209 discloses an invention for improving a case of alternate phase delay and advance by correcting the read waveform itself with an analog technique using a delay line, an attenuator or the like and thus reducing the peak shift of the read data as far as possible. In the circuit disclosed by JP-A-59-178608, on the other hand, a peak shift of alternate phase delay and advance is minimized by a cancel circuit to prevent the output of a phase comparator from being supplied to a voltage-controlled oscillator.

The conventional phase sync circuit shown in FIG. 10 fails to take into consideration the peak shifts with alternate phase delay and advance caused by the magnetic recording characteristic as mentioned above. This would not pose any problem as long as the recording density remains low because the long intervals of read data pulses makes the amount of the peak shifts negligible. With the rapid increase in data transfer speed and recording density, however, this problem has become one of the most important considerations in a phase sync circuit and is not negligible.

As described above methods of solving this problem are disclosed in JP-A-59-165209 and JP-A-59-78608. The method of JP-A-59-165209, however, is mainly aimed at symmetry of a read data waveform and fails to provide an effective means for solving the above-mentioned problem by completely eliminating the amount of peak shift. JP-A-59-178608, on the other hand, fails to take into consideration a case of frequent peak shifts with alternate phase advance and delay or, especially, the error which may occur between the rotational speed of each of a plurality of recording media connected to a single phase sync circuit and the free-running frequency of a voltage-controlled oscillator in the phase sync circuit in a large magnetic disk apparatus. More specifically, in the case where a peak shift of phase advance and delay occurs frequently (Such peak shift is frequent in many cases although the amount of shift varies as it is caused by the magnetic recording characteristic), the phase comparator 10 shown in FIG. 10 cannot detect the phase difference, and therefore the low-pass filter 20 produces 0 V as a DC signal A. The oscillation voltage of the voltage-controlled oscillator 30 thus becomes about 0 V, and the oscillation frequency thereof returns to the free-running frequency. As a result, an error of frequency or phase of the read data is impossible to correct or the fluctuations of the output of the voltage-controlled oscillator 30 around the free-running frequency reduces the phase-correcting ability.

Also, if a plurality of rotary recording media are used in connection, the variations in the rotational speed between them increases the difference between the free-running frequency of the voltage-controlled oscillator 30 and the rotational speed of the recording media, thus making it impossible to correct the phase and frequency from the very beginning.

SUMMARY OF THE INVENTION

The present invention provides a phase sync circuit of a magnetic recording apparatus for eliminating the correction of the timing pulse phase that is meaningless against a latently-existing peak shift, and preventing the increase in the jitter of the phase sync circuit thereby to permit accurate phase correction.

According to the present invention, there is provided a phase sync circuit comprising a phase comparator for comparing the phase of an input pulse with that of an output pulse, means for correcting the phase of the output pulse on the basis of the result of comparison thereby to form an output pulse in phase with the input pulse, and means arranged in the stage before the comparator for extracting and producing every other input pulse successively alternated between phase advance and delay. The extraction means may be configured to include a circuit energized only when the phase sync circuit is in a high-speed sync responding state at the time of pull-in, that is, only during a predetermined length of time following the start of input pulses.

According to another aspect of the invention, the circuit according to the present invention comprises means for determining beforehand whether an input pulse of advanced or delayed phase is to be synchronized.

According to still another aspect of the invention, the phase sync circuit may further comprise means for applying every other input pulse to a phase comparator, so that, in the case where the phase is advanced and delayed alternately, the phase difference of either the phase advance or delay is produced in accordance with the oscillation voltage of a voltage-controlled oscillator. As a result, the oscillation frequency of the voltage-controlled oscillator is not restored to a free-running frequency, while producing an output timing pulse in phase with an input pulse.

If every other input pulse is applied to a phase comparator, the number of input samples to a phase sync circuit (=amount of phase difference in this case) is reduced by one half, thus reducing the efficiency of the frequency-following function, although the jitter-suppressing function is improved. This problem is solved easily by increasing the loop gain of the phase sync circuit as a whole.

The same problem may also be solved by adding a circuit energized only for a predetermined length of time after starting application of an input pulse at the time of pull-in of the phase sync circuit. Specifically, the phase sync circuit is supplied with every other input pulse only during the predetermined length of time (under high-speed sync responding state), followed by applying every input pulse to the phase comparator. In this way, the reduction in the jitter-suppressing and frequency-following functions is completely eliminated in the low-speed sync responding state. In the high-speed sync responding state, on the other hand, the loop gain is set sufficiently high so that the reduction in the frequency-following function may not substantially pose any problem. It is thus possible to embody the present invention without changing the loop gain of the phase sync circuit.

According to a further aspect of the present invention, the synchronization (phase correction) at a phase sync circuit is based on the input pulses of selected one of advanced or delayed phase beforehand. The input pulses applied to the phase sync circuit may be limited to those of advanced (delayed) phase as predetermined, thus fixing the phase correction to the phase advance (delay).

BRIEF DESCRIPTION OF THE DRAWINGS

FIG. 1 is a block diagram showing an embodiment of the present invention.

FIG. 2 is a circuit diagram showing a first specific example of a read data control circuit shown in FIG. 1.

FIG. 3 is a time chart showing the operation of the circuit shown in FIG. 2.

FIG. 4 is a time chart showing the operation with the flip-flop circuit of FIG. 2 replaced by a monostable multivibrator.

DETAILED DESCRIPTION

The present invention will be explained more in detail below with reference to the embodiments shown in the accompanying drawings. In the embodiments described below, reference is made to a phase sync circuit supplied with an input pulse signal from a read data signal of a magnetic recording apparatus.

Figure 10:
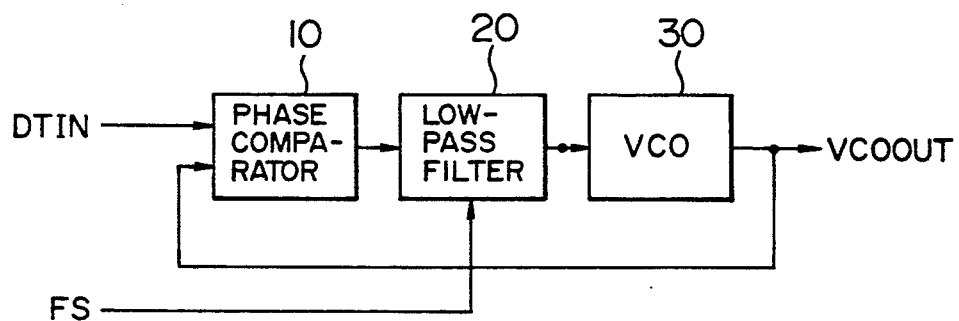
FIG. 10 is a block diagram showing an example of a conventional phase comparator.

A block diagram of an embodiment of the present invention is shown in FIG. 1. In FIG. 1, those component parts corresponding to those shown in FIG. 10 are denoted by the same reference numerals respectively. The embodiment shown in FIG. 1 is different from the conventional circuit shown in FIG. 10 in that the circuit of FIG. 1 includes a read data control circuit 40. In view of the fact that the read data signal DTIN alternates between phase advance and delay, the read data control circuit 40 applies every other pulse of the read data signal DTIN to a phase comparator 10. As a result, the phase comparator 10, a low-pass filter 20 and a voltage-controlled oscillator 30 process the read data signal DTIN only advanced or delayed in phase without any false operation, thus making it possible to produce an output signal VCOOUT in synchronism with the read data signal DTIN.

FIG. 2 is a circuit diagram showing a specific example of the read data control circuit 40 shown in FIG. 1. As shown, the read data control circuit 40 includes an inverter circuit 41, a flip-flop circuit 42 and an AND circuit 43.

Now, the operation of the read data control circuit 40 shown in FIG. 2 will be explained with reference to the time chart of FIG. 3. The flip-flop circuit 42 is inverted at the leading edge of the read data signal DTIN applied to an input terminal T because of the configuration thereof in which a reset output (terminal 0) is applied to an input terminal D. As shown in FIG. 3, the read data signal DTIN is applied, upon the first rise thereof, through the inverter circuit 41 to the input terminal T of the flip-flop circuit 42. The flip-flop circuit 42 is inverted and an output signal DTGT thereof turns to "1", thus opening the AND gate 43. Also, upon the fall of a second read data signal DTIN, the flip-flop circuit 42 is again inverted, so that the output signal DTGT is turned to "0", thus closing the AND gate 43. When the read data signal DTIN falls for the third time, the flip-flop circuit 42 is inverted once again, and the output signal DTGT turns "1", thus opening the AND gate 43. In this way, the flip-flip circuit 42 (that is, the output signal DTGT thereof) is repeatedly inverted each time the read data signal DTIN falls, thus repeating the opening and closing of the AND gate 43. Since the read data signal DTIN is also applied to the other input of the AND circuit 43, the output signal NDT is produced in the form of read data signal DTIN only when the AND gate 43 is open (with DTGT in "1" state). As seen from FIG. 3, therefore, the AND circuit 43 produces the read data signal DTIN as a signal NDT for every other pulse thereof. In other words, only selected one of phase advance and phase delay is produced in the form of signal NDT from the read data control circuit 40 and is applied to the phase comparator 10.

Even if the flip-flop circuit 42 in FIG. 2 is replaced by a monostable multivibrator circuit, it is possible to have exactly the same effect as the first embodiment by setting the one-shot time $T_1$ in FIG. 4 to a level longer than the time $T_2$ from the first fall to the second fall of the read data signal DTIN but shorter than the time $T_3$ from the first fall to third fall thereof.

In the embodiments described above, peak shifts of only one of advanced and delayed phases may be applied to the phase comparator 10 by use of a very simple circuit providing a most inexpensive means.

Figure 5:
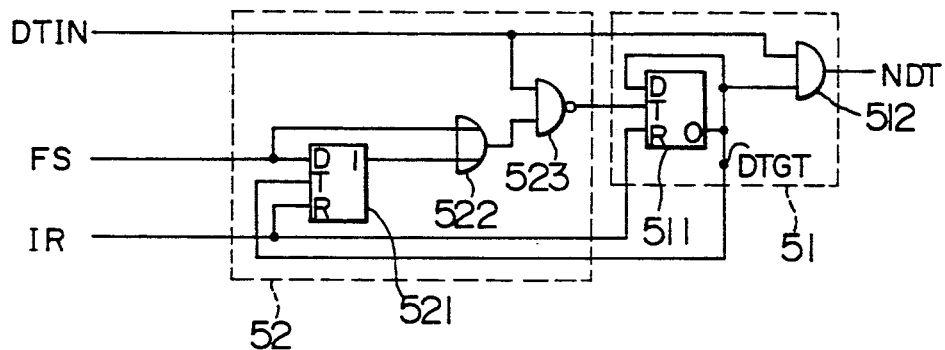
FIG. 5 is a circuit diagram showing a second specific example of a read data control circuit of FIG. 1.

FIG. 5 is a diagram showing a second specific example of the read data control circuit 40. This read data control circuit is an improvement over the one shown in FIG. 2, and is comprised of a circuit 51 having the same function as the read data control circuit 40 shown in FIG. 2 and a DTIN change-over control circuit 52. The DTIN change-over control circuit 52 is for producing every other read data signal pulse DTIN as a signal NDT by the circuit 51 only under the high-speed sync responding state of the phase sync circuit.

As shown in the diagram, the circuit 51 includes a flip-flop circuit 511 and an AND circuit 512, the DTIN change-over control circuit 52 includes a flip-flop circuit 521, an OR circuit 522 and an AND circuit 523.

The signal IR applied to the flip-flop circuits 511, 521 is for turning the flip-flop circuits 511, 521 to the initial value "0" and is produced before the read operation starts such as when power is turned on. The signal FS, on the other hand, is for switching the sync responding states of the phase sync circuit. The signal FS turns "1" into a high-speed sync responding state for a predetermined length of time (for several bytes) from a time point when the synchronization starts for the read data signal DTIN from the free-running frequency of the voltage-controlled oscillator 30. After the lapse of the predetermined length of time, the signal FS turns "0" into the low-speed sync responding state.

Figure 6:
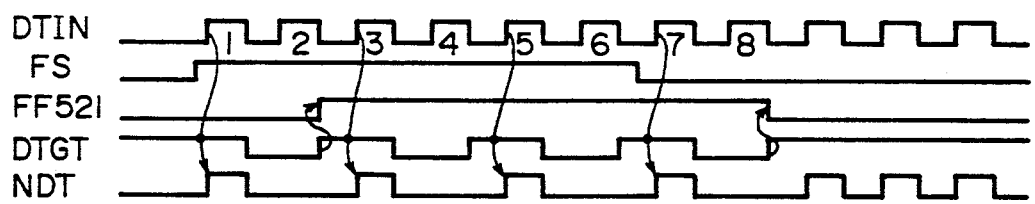
FIG. 6 is a time chart showing the operation of the circuit of FIG. 5.

FIG. 6 is a time chart showing the operation of the read data control circuit shown in FIG. 5. The operation of the read data control circuit shown in FIG. 5 will be explained with reference to FIG. 6. First, the reading operation is started, and after the signal IR is turned "0", the signal FS is turned "1" as shown in FIG. 6, thus starting the synchronization of the phase sync circuit. The "1" FS signal is applied through the OR circuit 522 to open the gate circuit 523. The first read data signal DTINS1 is applied through the AND circuit 523 to the input terminal T of the flip-flop circuit 511.

The flip-flop circuit 511 is configured to be inverted in state at the leading edge of the input signal to the input terminal T like the flip-flop circuit 42 shown in FIG. 2. As a result, at the fall of the read data signal DTIN, the flip-flop circuit 511 is inverted into "1" state, and the reset output signal DTGT thereof is turned "0", thus closing the AND gate 512.

A second fall of the read data signal DTIN inverts the flip-flop circuit 511 into "0" state through the AND circuit 523, and the reset output signal DTGT of the flip-flop circuit 511 becomes "1". Then the AND circuit 512 opens. The output signal DTGT in "1" state, on the other hand, is applied to the input terminal T of the flip-flop circuit 521. Since the signal FS is "1", the input terminal D of the flip-flop circuit 521 is supplied with "1" signal, so that the flip-flop circuit 521 is set to "1" state. The flip-flop circuit 521 is thereafter remains "1" until the rise of the output signal DTGT following the turning of the signal FS into "0" state. When the flip-flop circuit 521 turns "1", a "1" signal is produced from the set output terminal of the flip-flop circuit 521 and is applied to the AND circuit 523 through the OR circuit 522. As a result, even after the signal FS turns "0" thereafter, the gate of the AND circuit 523 is held open until the flip-flop circuit 521 turns "0".

Upon a third fall of the read data signal DTIN, the flip-flop circuit 511 is inverted into "1" state to turn the reset output signal DTGT into "0" state, thus closing the AND gate 512. In this manner, the flip-flop circuit 511 is repeatedly inverted until the rise of the signal DTGT or until the inversion of the flip-flop circuit 521 into "0" state after the signal FS turns "0". In the meantime, the AND gate 512 repeatedly opens and closes as shown by the specific example of FIG. 2. Assuming, therefore, that the signal FS turns "0" during the sixth and seventh rises as shown in FIG. 6 (Actually, there are about 20 to 30 read data signals DTIN because the signal FS is kept "1" for several bytes), the input terminal d of the flip-flop circuit 521 is supplied with a "0" signal, and one of the inputs of the OR circuit 522 turns "0". Since the flip-flop circuit 521 still remains "1", however, the set output of the OR circuit 522 is held "1", so that the AND gate 523 remains open. Since the AND gate 523 is open, the flip-flop circuit 511 is inverted at the seventh and eighth falls of the read data signal DTIN. The inversion of the flip-flop circuit 511 into "0" state at the eighth fall of the read data signal DTIN causes the reset output signal DTGT thereof to turn "1", thus opening the AND gate 512. On the other hand, the output signal DTGT turned "1" at the eighth fall of the read data signal DTIN is applied to the input terminal T of the flip-flop circuit 521. Since the input terminal D of the flip-flop circuit 512 is already supplied with a "0" signal, the flip-flop 521 is inverted into "0" state. The flip-flop circuit turns "0", and the set output thereof also turns "0", thereby closing the AND gate 523 through the OR circuit 522. Upon closing of the AND gate 523, the read data signal DTIN ceases to be applied to the input terminal T of the flip-flop circuit 511. The flip-flop circuit 511 is not subsequently inverted at all but is kept "0" until the signal FS turns "1" again. In other words, the reset output signal DTGT remains "1" with the AND gate 512 kept open.

As described above, the AND gate 512 repeatedly opens and closes alternately in response to the read data signal DTIN as in the specific example shown in FIG. 2 as long as the FS signal remains "1", and the AND gate 512 remains open while the signal FS is "0". The read data signal DTIN is thus produced in the form of signal NDT through the AND circuit 512 only when the AND gate 512 is open with the reset output signal DTGT in "1" state. Specifically, the signal NDT is produced from every other read data signal DTIN immediately after the signal FS turns "1" (high-speed sync response state), and every read data signal DTIN is produced as a signal NDT after the signal FS turns "0". According to the second embodiment described above, it is possible to apply every other read data signal pulse DTIN to the phase comparator 10 only under the high-speed sync responding state, thus permitting the present invention to be embodied without changing the loop gain of the phase sync circuit.

Figure 7:
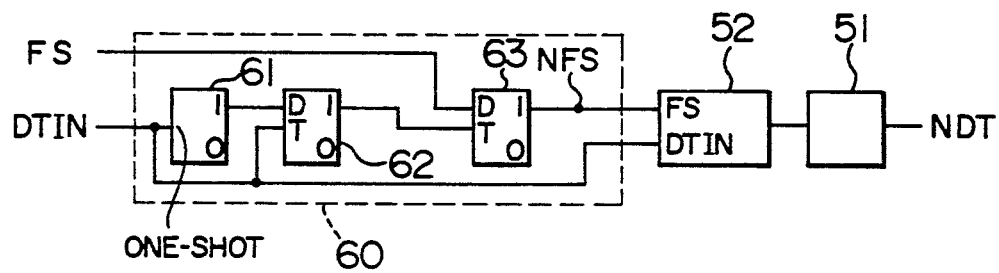
FIGS. 7 and 8 are circuit diagrams showing a third specific example of the read data control circuit of FIG. 1.

A third specific example of the read data control circuit 40 of FIG. 1 is shown in FIG. 7. This specific example is a further improvement of the read data control circuit shown in FIG. 5, and comprises a function of fixing the read data signal DTIN applied to the phase comparator 10 at the advanced phase.

The read data control circuit shown in FIG. 7 comprises, as seen, a phase detection circuit 60 including a monostable multivibrator (hereinafter sometimes referred to merely as "the one-shot circuit") and flip-flop circuits 62, 63 in addition to the DTIN change-over range control circuit 52 and the circuit 51 shown in FIG. 5. The operation due to the combination the DTIN change-over range control circuit 52 and the circuit 51 is identical to that of the specific example shown in FIG. 5. Thus the operation of the phase detection circuit 60 will be explained below with reference to the time chart of FIG. 9.

Figure 9:
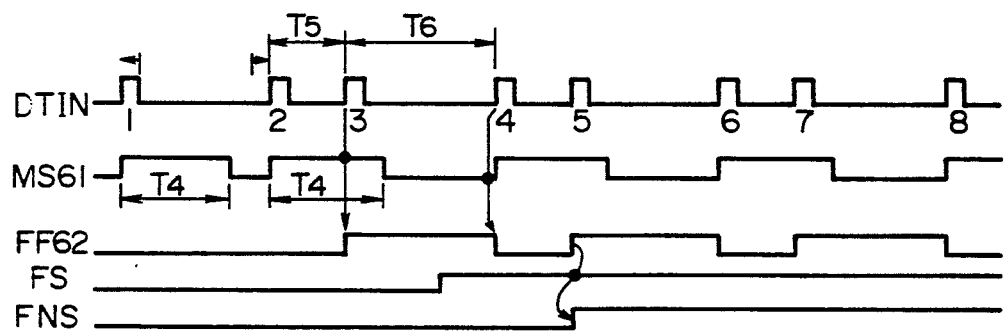
FIG. 9 is a time chart showing the operation of the circuit of FIG. 7.

FIG. 7 shows a circuit for detecting the phase advance and producing a signal NFS synchronous with the rise timing of the read data signal DTIN of advanced phase. In FIG. 9, the one-shot time $T_4$ of a one-shot circuit 61 is set to the period of the read data signal DTIN in a hypothetical ideal state free from a peak shift. Specifically, it is set to a time length $T_4$ intermediate $T_5$ and $T_6$ where $T_5$ is the time from the delayed phase pulse (second) of the read data signal DTIN to the advanced phase pulse (third) and $T_6$ the time length from the advanced phase pulse (third) to the delayed phase pulse (fourth) in FIG. 9. Thus, $$T_4 = \frac{T_5 + T_6}{2}.$$

As shown in FIG. 9, assume that peak shifts of the read data signal DTIN occur in such a manner that odd-numbered pulses are advanced and even-numbered ones delayed in phase. The one-shot circuit 61 tries to start the one-shot operation at the rise time of each read data signal DTIN. Therefore, the first and second pulses of the read data signal DTIN perform the one-shot operation for the time $T_4$, and the one-shot circuit 61 produces a "1" signal for the time length $T_4$. No operation is performed, however, at the rise time of the third pulse (advanced in phase) of the read data signal DTIN where the second one-shot operation has not yet completed. At the next fourth rise time of the read data signal DTIN, the previous one-shot operation is already complete, and therefore the one-shot operation is performed again for the time length $T_4$. In this way, the one-shot circuit 61, except for the first pulse of the read data signal DTIN, performs the one-shot operation for the time $T_4$ at even-numbered (phase-delayed) pulses thereof, while no operation is performed at odd-numbered (phase advanced) pulses in timings where the immediately-preceding one-shot operation is not yet complete. The first pulse which performs the one-shot operation has no effect at all on the subsequent operations, thus posing no problem. The flip-flop circuit 62, which is supplied with an output of the one-shot circuit 61 at the input terminal D and the read data signal DTIN at the input terminal T thereof, is set to "1" when the read data signal DTIN rises like the third rise during the one-shot operation of the one-shot circuit 61, and is set to "0" when the read data signal DTIN rises, like the fourth one, immediately before the one-shot operation of the one-shot circuit 61. More specifically, as shown in FIG. 9, the set output (output terminal 1) of the flip-flop circuit 62 is operated in such a manner as to assume "1" state at the odd-numbered pulses of the read data signal DTIN and "0" state at the even-numbered pulses thereof. This operation is repeated as long as the read data signal DTIN is applied. As shown in FIG. 9, the signal FS assumes "1" state between the third and fourth pulses of the read data signal DTIN. The signal FS is thus applied to the input terminal D of the flip-flop circuit 63, and the set output of the flip-flop circuit 62 to the input terminal T of the flip-flop circuit 63. As a result, the flip-flop circuit 63 is set to "1" state through the flip-flop circuit 63 at the fifth rise of the read data signal DTIN, so that the signal NFS turns "1" at the same timing. In other words, the signal NFS turns "1" at the rise of the read data signal DTIN of advanced phase immediately following the turning "1" of the signal FS, and turns "0" at the rise of the read data signal DTIN of advanced phase immediately after turning "0" of the FS signal. If the signal NFS, in place of the signal FS shown in FIG. 5, is applied to the input terminal D of the flip-flop circuit 521 and the OR circuit 522, therefore, every other pulse of the read data signal DTIN is produced in the form of signal NDT from the signal DTIN (fifth one in FIG. 9) immediately after turning "1" of the signal NFS (signal FS in FIG. 5), and is applied to the phase comparator 10.

As seen from above, only the odd-numbered read data signal pulses shown in FIG. 9, that is, only those signals DTIN of advanced phase are applied to the phase comparator 10. Also, in the case where the circuit is modified as shown in FIG. 8, only even-numbered pulses of the read data signal DTIN shown in FIG. 9, that is, only the read data signal DTIN is delayed phase may be applied to the phase comparator 10.

Figure 8:
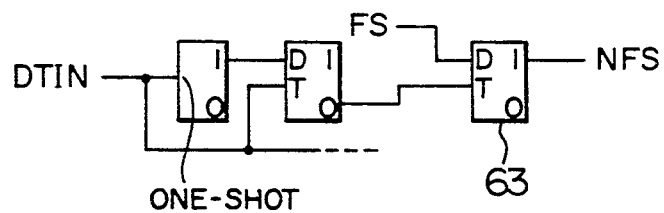

Further, if the phase detection circuit 60 shown in FIG. 7 is modified in the manner shown in FIG. 8, that is, if the reset output terminal (output terminal 0) of the flip-flop circuit 62 is connected to the input terminal T of the flip-flop circuit 63, the delayed phase may be detected to produce a signal NFS in synchronism with the rise timing of the read data signal DTIN of delayed phase.

As will be understood from the foregoing description, the read data control circuit shown in FIGS. 7 and 8 is able to determine as to whether the phase correction should be based on the read data signal DTIN of advanced or delayed phase. It is thus possible to obtain the effect mentioned below in a data discrimination circuit connected to the phase sync circuit. Specifically, it is possible to fix the phase relationship between a read data and a data discrimination window (prepared from a timing pulse produced from the voltage controlled oscillator 30) in a data discrimination circuit for discriminating and separating one data from another or the read data into data and clock, thus improving the phase margin of the read data very effectively. This will prove especially effective as the data discrimination window is expected to decrease in width with the increase in the recording density.

According to a preferred embodiment of the present invention, in the case of peak shifts with the phase thereof advanced and delayed alternately due to the magnetic recording characteristic, a phase comparator may be supplied with every other data pulse constantly or only under a high-speed sync responding state, or with selected one of advanced and delayed read data pulses only under the high-speed sync responding state. As a consequence, in the case where peak shifts occur constantly or a plurality of recording media are connected vary in rotational speed, both phase and frequency are accurately corrected. Further, according to another embodiment of the present invention, the phase correction is based beforehand on the advanced or delayed phase, and therefore the phase margin is effectively improved.

What is claimed is:

1. A phase sync circuit comprising:
    means for extracting every other pulse of an input pulse signal containing alternate phase-advanced and phase-delayed pulses;
    means for correcting the phase of an output pulse in accordance with a phase difference signal and for generating an output pulse in phase with the input pulse signal; and
    means, connected to the extraction means and the output pulse generation means, for comparing the phase of the pulse extracted by the extraction means with that of the output pulse produced from the output pulse generation means and generating a phase difference signal in accordance with the result of comparison.

2. A phase sync circuit comprising:
    means for extracting every other pulse of an input pulse signal containing alternate phase-advanced and phase-delayed pulses;
    means for correcting the phase of an output pulse in accordance with a phase difference signal and for generating an output pulse in phase with the input pulse signal; and
    means, connected to the extraction means and the output pulse generation means, for comparing the phase of the pulse extracted by the extraction means with that of the output pulse produced from the output pulse generation means and generating a phase difference signal in accordance with the result of comparison;
    wherein said extraction means includes a circuit adapted to operate for extraction only during a predetermined length of time after application thereto of the input pulse at the time of pull-in of the phase sync circuit.

3. A phase sync circuit according to claim 2, wherein the circuit adapted to operate for extraction only during a predetermined length of time includes a circuit for determining selected one of advanced-phase and delayed-phase input pulses in accordance with which phase is to be synchronized.

4. A phase sync circuit comprising:
    a read data control circuit adapted to periodically extract non-adjacent pulses of an input pulse signal, containing alternate phase-advanced and phase-delayed pulses, read from a recording medium;
    a voltage-controlled oscillator generating an output pulse in synchronism with said input pulse by changing an oscillation frequency of the oscillator in accordance with a voltage of a smoothed phase difference signal;
    a phase comparator connected to the read data control circuit and the voltage-controlled oscillator and comparing the phase of the pulse extracted by the read data control circuit with that of an output pulse of the voltage-controlled oscillator and generating a phase difference signal having a voltage corresponding to a result of the comparison; and
    a low-pass filter inserted between the phase comparator and the voltage-controlled oscillator, receiving phase difference signal and producing said smoothed phase difference signal.

* * * * *